United States Patent
Da Silva et al.

(10) Patent No.: US 11,075,778 B2
(45) Date of Patent: Jul. 27, 2021

(54) APPARATUS, SYSTEM AND METHOD OF WIRELESS SENSING

(71) Applicant: INTEL CORPORATION, Santa Clara, CA (US)

(72) Inventors: Claudio Da Silva, Portland, OR (US); Ariela Zeira, Encinitas, CA (US); Preston Hunt, Portland, OR (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 18 days.

(21) Appl. No.: 16/583,588

(22) Filed: Sep. 26, 2019

(65) Prior Publication Data

US 2020/0021466 A1  Jan. 16, 2020

(51) Int. Cl.
 *H04L 25/02* (2006.01)

(52) U.S. Cl.
 CPC ...... *H04L 25/0204* (2013.01); *H04L 25/0242* (2013.01)

(58) Field of Classification Search
 CPC ............. H04L 25/0204; H04L 25/0242; H04L 25/021
 See application file for complete search history.

(56) References Cited

U.S. PATENT DOCUMENTS

| | | | | |
|---|---|---|---|---|
| 2010/0111215 A1* | 5/2010 | Nandagopalan | ..... | H04B 7/0617 375/267 |
| 2012/0088525 A1* | 4/2012 | Kurokawa | ............ | H04W 4/029 455/456.5 |
| 2013/0114441 A1* | 5/2013 | Yoo | ...................... | H04L 25/0206 370/252 |
| 2016/0149612 A1* | 5/2016 | Julson | ................... | H04L 12/403 375/224 |
| 2017/0272138 A1* | 9/2017 | Chun | ..................... | H04L 69/323 |
| 2017/0343658 A1* | 11/2017 | Ramirez | ............ | G08B 13/2491 |
| 2018/0241444 A1* | 8/2018 | Ao | ....................... | H04B 7/0456 |

(Continued)

OTHER PUBLICATIONS

Tony Xiao Han, Huawei, et al., "Wi-Fi sensing"; Doc.: IEEE 802.11-19/1164r0; Jul. 2019, 15 pages.

(Continued)

*Primary Examiner* — Christine Ng
(74) *Attorney, Agent, or Firm* — Shichrur & Co.

(57) ABSTRACT

For example, a first wireless communication device may be configured to cluster a plurality of channel estimation measurements into a plurality of clusters based on a clustering criterion, the plurality of channel estimation measurements corresponding to a respective plurality of Physical Protocol Data Units (PPDUs) received from a second wireless communication device over a wireless communication channel; and, based on clustering of the plurality of channel estimation measurements into the plurality of clusters, selectively provide a clustered channel estimation measurement to be processed for detection of changes in an environment of the wireless communication channel, by providing the clustered channel estimation measurement together with one or more other clustered channel estimation measurements of a same cluster of the clustered channel estimation measurement to be processed for the detection of the changes in the environment.

25 Claims, 11 Drawing Sheets

(56) References Cited

U.S. PATENT DOCUMENTS

| | | | |
|---|---|---|---|
| 2019/0288894 A1* | 9/2019 | Boudreau | H04L 27/0006 |
| 2020/0258379 A1* | 8/2020 | Bariant | G08G 1/01 |
| 2020/0367223 A1* | 11/2020 | Cheng | H04B 7/0617 |

OTHER PUBLICATIONS

Claudio da Silva et al., "Wi-Fi sensing: Usages, requirements, technical feasibility and standards gaps"; doc.: IEEE 802.11-19/1293r0; Jul. 2019; 21 pages.

Kun Qian et al., "PADS: Passive Detection of Moving Targets with Dynamic Speed using PHY Layer Information", 2014, 8 pages.

Yongsen Ma, Gang Zhou, and Shuangquan Wang, "WiFi Sensing with Channel State Information: A Survey", ACM Computing Surveys, vol. 52, No. 3, Article 46. Publication date: Jun. 2019, 36 pages.

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

\* cited by examiner

US 11,075,778 B2

APPARATUS, SYSTEM AND METHOD OF WIRELESS SENSING

TECHNICAL FIELD

Embodiments described herein generally relate to wireless sensing.

BACKGROUND

Wireless sensing is a term given to a usage of wireless technology to perform radar-like applications. For example, wireless sensing may be used to detect motion in a room, for example, to detect when a person approaches a target device.

The wireless sensing may be implemented by a wireless communication device, which is capable to receive wireless signals, for example, to detect changes in an environment where the wireless signals propagate.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
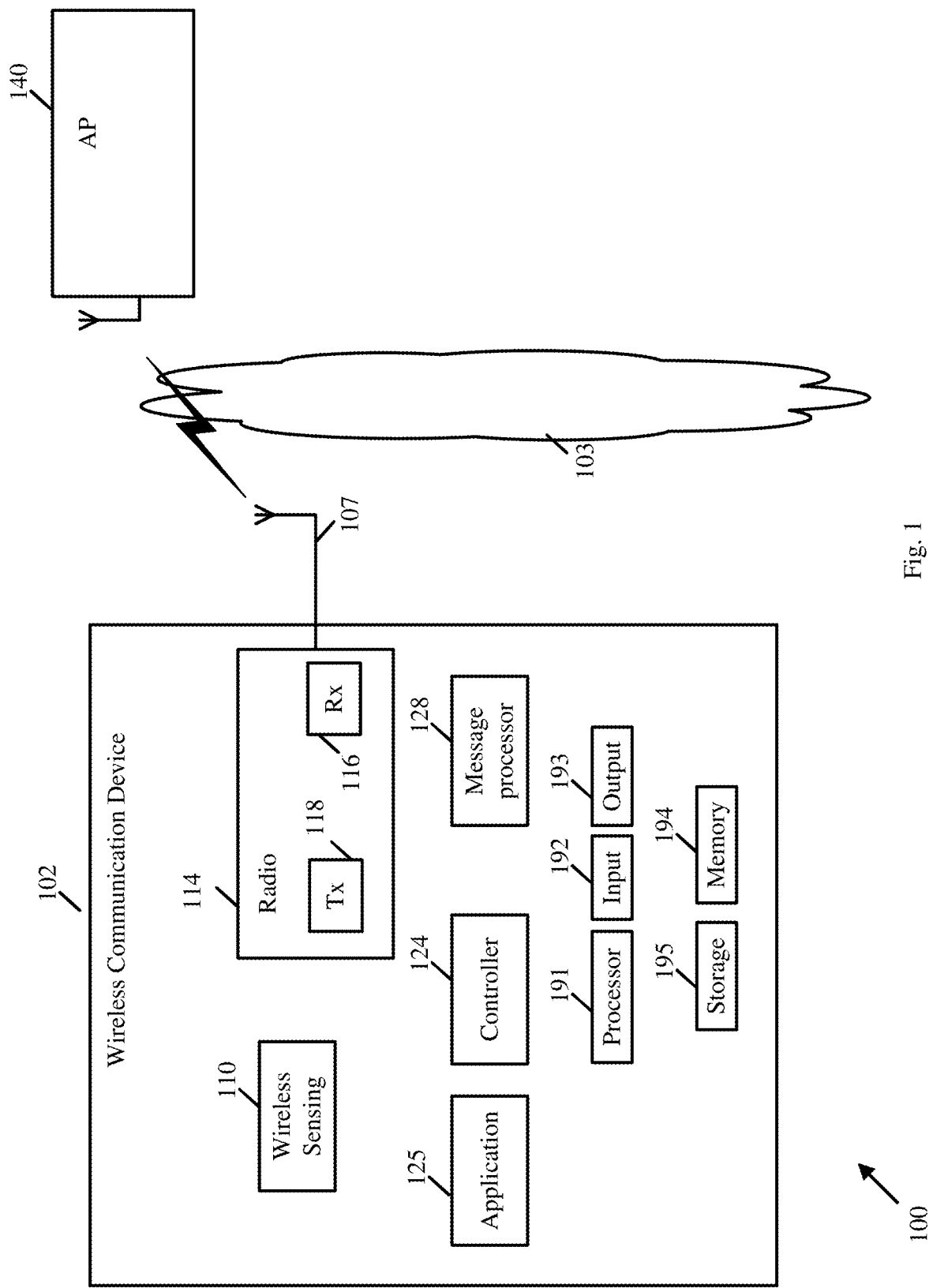
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Bluetooth device, a Bluetooth Low Energy (BLE) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., a wireless communication device 102, and/or at least one wireless communication device 140.

In some demonstrative embodiments, wireless communication device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of, any other devices and/or STAs.

In some demonstrative embodiments, device 102 may include a STA and/or device 140 may include an access point (AP) STA.

In one example, device 140 may be configured to operate as, perform one or more operations of, and/or to perform the functionality of, an AP; and/or device 102 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication device 102 may be capable of communicating content, data, information and/or signals via a wireless medium (WM) 103.

In some demonstrative embodiments, wireless medium 103 may include, for example, a radio channel, a channel, a cellular channel, a Global Navigation Satellite System (GNSS) Channel, an RF channel, a WiFi channel, an IR channel, and the like.

In some demonstrative embodiments, wireless communication medium 103 may include a 2.4 GHz frequency band, and/or one or more other wireless communication frequency bands, for example, a 5 GHz frequency band, a millimeter-Wave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102, 140 and/or one or more other devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radio 114 may be configured to communicate over a 2.4 GHz band and/or any other band.

In some demonstrative embodiments, radio 114 may include, or may be associated with, one or more antennas.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include, operate as, perform the role of, and/or perform one or more functionalities of, one or more STAs.

In some demonstrative embodiments, device 102 and/or device 140 may form, or may communicate as part of, a wireless local area network (WLAN).

In some demonstrative embodiments, device 102 and/or device 140 may form, or may communicate as part of, a WiFi network.

In other embodiments, device 102 and/or device 140 may form, and/or communicate as part of, any other additional or alternative network.

In some demonstrative embodiments, device 102 may be configured to perform wireless sensing, e.g., as describe below.

In some demonstrative embodiments, wireless sensing (also referred to as "Wi-Fi sensing") may refer to a term given to a usage of wireless technology to detect changes in an environment, for example, based on received wireless signals.

In some demonstrative embodiments, the environment may include an area around a device, e.g., within a few centimeters or meters from the device. The area may include a room, a house, an enterprise, and the like.

In one example, the wireless sensing may include performing radar-like applications. For example, wireless sensing may be used to detect motion in a room, for example, to detect when a person approaches a target device.

In some demonstrative embodiments, the wireless sensing may be configured to detect one or more features in the environment, for example, a motion, a presence or proximity, a gesture, a people counting, a geometry, a velocity, and/or the like.

In some demonstrative embodiments, the wireless sensing may be configured to detect a target in the environment, for example, an object, a human, an animal, and/or the like.

In some demonstrative embodiments, the wireless sensing may be used by a wireless sensing device, e.g., device 102, which is capable to receive wireless signals, for example, to detect changes in an environment, e.g., where the wireless signals propagate.

In some demonstrative embodiments, a wireless sensing device, e.g., device 102, may perform the wireless sensing, for example, by tracking a channel state of a wireless communication channel, which may be obtained, for example, when decoding a plurality of received wireless packets over time, e.g., as described below.

In one example, the channel state may include a Channel Frequency Response (CFR), which may be estimated by a receiver when processing a PPDU to extract transmitted data from the PPDU, for example, using a non-high-throughput (HT) or very HT (VHT) Long Training Field (L-LTF or VHT-LTF), and/or any other field.

In some demonstrative embodiments, the wireless sensing device, e.g., device 102, may detect variations in the received wireless packets, which may indicate a change in the environment, for example, a motion in the environment, e.g., as described below.

In some demonstrative embodiments, the wireless sensing may not require that a person and/or an object that is being tracked or detected should carry or have a wireless device or transmitter, or that a carried wireless device collaborate with the wireless sensing device. For example, the wireless sensing may be performed passively, for example, by relying on changes to the channel state, which may be caused by the person or the object moving in the environment.

In some demonstrative embodiments, device 102 may include a wireless sensing component 110 configured to sense changes in an environment, for example, based on wireless technology, e.g., as described below.

In some demonstrative embodiments, wireless sensing component 110 may be configured to perform one or wireless sensing measurements, operations and/or communications, e.g., as described below.

In some demonstrative embodiments, wireless sensing component 110 may be configured to detect the one or more changes in the environment, for example, to detect a motion in the environment, e.g., as described below.

Some demonstrative embodiments are described herein with respect to a wireless sensing component, e.g., wireless sensing component 110, configured to perform measurements for motion detection. However, in other embodiments, the wireless sensing component may be configured to perform any other additional or alternative type of wireless sensing.

In some demonstrative embodiments, wireless sensing component 110 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of wireless sensing component 110. Additionally or alternatively, one or more functionalities of wireless sensing component 110 may be implemented by logic, which may be executed by a machine and/or one or more processors, e.g., as described below.

In some demonstrative embodiments, wireless sensing component 110 may be configured to perform one or more operations of, and/or at least part of the functionality of, message processor 128 and/or controller 124, for example, to trigger communications and/or transmissions of one or more wireless sensing messages and/or wireless sensing signals.

In some demonstrative embodiments, wireless sensing component 110 may be configured to trigger wireless sensing measurements, for example, periodically and/or upon a request, from an application executed by device 102, for example, to determine the changes in the environment.

In some demonstrative embodiments, device 102 may include one or more applications configured to provide and/or to use one or more wireless sensing applications and/or services. For example, device 102 may include an application 125 to be executed by device 102.

In some demonstrative embodiments, application 125 may use wireless sensing information, for example, from wireless sensing component 110, for example, to provide one or more wireless sensing applications and/or services.

In one example, application 125 may include a motion detection application configured to provide and manage alerts and/or information with respect to motion in an environment. According to this example, application 125 may use the wireless sensing information, e.g., from wireless sensing component 110, for example, to detect human presence or motions in an environment, approaching a target or leaving a target, and/or the like. For example, wireless sensing component 110 may output a motion alert, e.g., to be received by application 125, for example, to indicate motion in the environment, based on the detection of changes in the environment.

In another example, application 125 may include an office management application configured to manage offices, conference rooms, and the like. According to this example, application 125 may use the wireless sensing information, e.g., from wireless sensing component 110, for example, to determine presence of employees, availability of conference rooms, presence in conference rooms, and/or the like.

In another example, application 125 may include a safety or security application configured to provide safety and/or security alerts to a user. According to this example, application 125 may use the wireless sensing information, e.g., from wireless sensing component 110, for example, to determine presence of kids in a locked vehicle, presence of intruders in an environment, and/or the like.

In another example, application 125 may include a health application configured to provide health information to a user. According to this example, application 125 may use the wireless sensing information, e.g., from wireless sensing component 110, for example, to determine biometric abnormalities, to assist in elderly care, and/or the like.

In another example, application 125 may include a user interface (UX) application or service configured to provide gesture information to an operating system of device 102, and/or any other applications. According to this example, application 125 may use the wireless sensing information, e.g., from wireless sensing component 110, for example, to detect gestures of a user, e.g., coarse or fine, for example, finger movements or hand waves, and/or the like.

In another example, application 125 may include any other application or service configured to use the wireless sensing information, e.g., from wireless sensing component 110.

In some demonstrative embodiments, there may be a need for a technical solution to increase and/or to improve a reliability and/or an accuracy of the wireless sensing, e.g., as described below.

In some demonstrative embodiments, it may be advantageous to distinguish between changes in a wireless communication channel, which result from a motion, and changes in the wireless communication channel, which result from other reasons, e.g., noise and/or the like.

In one example, in some use cases, deployments and/or scenarios, performance of wireless sensing may degrade, for example, if a wireless communication device, e.g., device 140, that transmits sensing packets, which may be used by wireless sensing component 110 for wireless sensing, changes its transmit parameters over time, for example, if a wireless sensing device, e.g., device 102, is unable to differentiate between the changes in the transmit parameters and the channel variations, e.g., as described below.

In some demonstrative embodiments, for example, a transmitter of the sensing packets, e.g., device 140, may change its transmit parameters during a sensing operation. For example, there may be a technical problem, if wireless sensing device, e.g., device 102, is not able to distinguish whether the observed fluctuation in a wireless communication channel is due to transmit parameter changes, or to movement in the environment, or due to both. As a result, the wireless sensing device, e.g., device 102, may mistakenly detect changes in transmit parameters as motions, and, consequently, a reliability and/or accuracy of the wireless sensing may be significantly reduced.

In some demonstrative embodiments, one or more types of wireless communication devices, e.g., APs, which transmit the sensing packets, may be characterized, e.g., as described below.

In one example, in a first case, one or more APs may implement a fixed transmit parameter set, for example, when only one antenna is implemented and/or sensing frames may be transmitted with an omni or quasi-omni antenna pattern.

In another example, in a second case, one or more APs may implement a reduced number of transmit parameter sets, for example, when an AP performs beamforming by transmitting the sensing frames to a fixed number of directions, e.g., to increase range; and/or when APs having multi-antenna implementations transmit beacon frames using one antenna at a time, e.g., a TX antenna diversity.

In another example, in a third case, one or more APs may implement one or more advanced MIMO transmission schemes, which may continuously change transmit parameter sets, for example, by performing a refined form of beamforming, e.g., compared to the beamforming described above with respect to the second case. As a result, a number of transmit parameter sets may be larger than the reduced number of transmit parameter sets, e.g., as described above.

Figure 2:
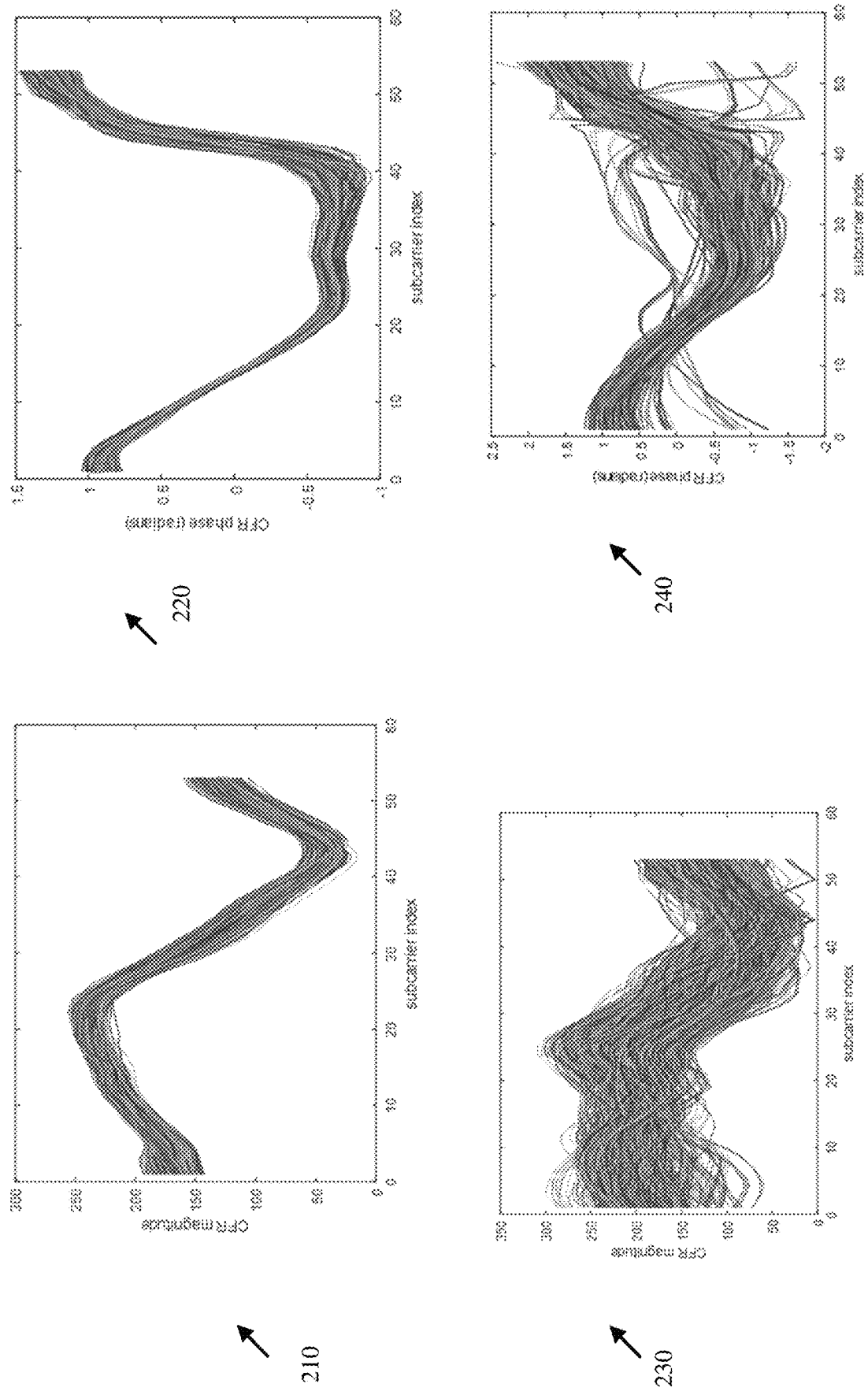
FIG. 2 is a schematic illustration of graphs depicting channel estimates, in accordance with some demonstrative embodiments.

Reference is made to FIG. 2, which schematically illustrates graphs 210, 220, 230 and 240 depicting channel estimates in an environment, in accordance with some demonstrative embodiments.

In some demonstrative embodiments, the graphs of FIG. 2 depict Channel Frequency Responses (CFRs) corresponding to a plurality of Physical Protocol Data Units (PPDUs) received by a wireless sensing device during a predefined time period, e.g., of about 3 minutes, from a wireless communication device, e.g., as described below.

As shown in FIG. 2, each curve of the graphs 210, 220, 230 and 240 corresponds to a PPDU received by the wireless sensing device during the predefined time period.

In some demonstrative embodiments, graph 210 depicts a plurality of magnitude curves corresponding to a respective plurality of PPDUs. For example, a magnitude curve includes a plurality of magnitude measurements corresponding to a plurality of subcarriers of a PPDU of the plurality of PPDUs. The plurality of magnitude measurements of graph 210 are measured during the predefined time period, for example, when there is no motion in the environment.

In some demonstrative embodiments, graph 220 depicts a plurality of phase curves corresponding to a respective plurality of PPDUs. For example, a phase curve includes a plurality of phase measurements corresponding to a plurality of subcarriers of a PPDU of the plurality of PPDUs. The plurality of phase measurements of graph 220 are measured during the predefined time period, for example, when there is no motion in the environment.

In some demonstrative embodiments, graph 230 depicts a plurality of magnitude curves corresponding to a respective plurality of PPDUs. For example, a magnitude curve includes a plurality of magnitude measurements corresponding to a plurality of subcarriers of a PPDU of the plurality of PPDUs. The plurality of magnitude measurements of graph 230 are measured during the predefined time, for example, when there is motion in the environment during the predefined time period, for example, when a person randomly walks in the environment.

In some demonstrative embodiments, graph 240 depicts a plurality of phase curves corresponding to a respective plurality of PPDUs. For example, a phase curve includes a plurality of phase measurements corresponding to a plurality of subcarriers of a PPDU of the plurality of PPDUs. The plurality of magnitude measurements of graph 240 are measured during the predefined time, for example, when there is motion in the environment during the predefined time period, for example, when a person randomly walks in the environment.

In some demonstrative embodiments, as shown in graphs 230 and 240, when a person or object moves around the environment, it impacts how wireless signals, e.g., PPDUs, propagate from a transmitter to a receiver. For example, propagation paths may be created and destructed, while generating time-varying multipath fading.

In some demonstrative embodiments, as shown in graphs 210 and 220, the channel estimates show little time variations when the environment is static, e.g., when there is no motion in the environment.

In some demonstrative embodiments, as shown in graphs 230 and 240, the channel estimates show significant changes when there is motion in the environment, for example, under certain conditions. For example, the changes in the channel estimates may depend, for example, on a relative position between the person and object, to the transmitter, and/or to the receiver.

In some demonstrative embodiments, the channel estimates of graphs 210-240 may be obtained with respect to a wireless communication device, which does not change a transmit parameter set or configuration, e.g., when transmitting the PPDUs, e.g., beacon frames. Therefore, when the wireless sensing device detects changes in the estimated channel, e.g., as shown in graph 230 and/or graph 240, the wireless sensing device can reliably conclude that the channel fluctuations result from motion in the environment, and not from a change in the transmit parameter set of the transmitter. However, in some cases, the wireless communication device may change the transmit parameter set, without the wireless sensing device being aware or notified about the change, e.g., as described above.

Figure 3:
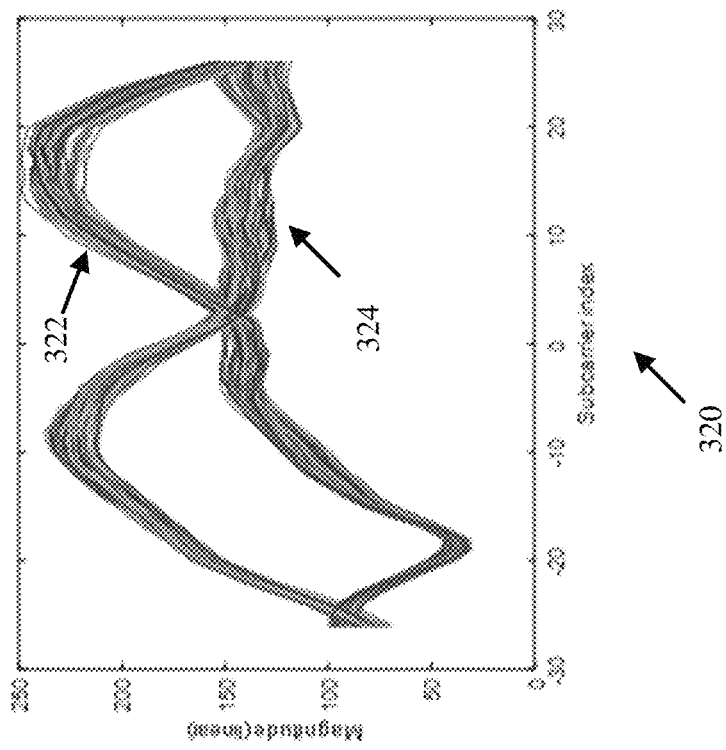
FIG. 3 is a schematic illustration of graphs depicting channel estimates, in accordance with some demonstrative embodiments.
Figure 3:
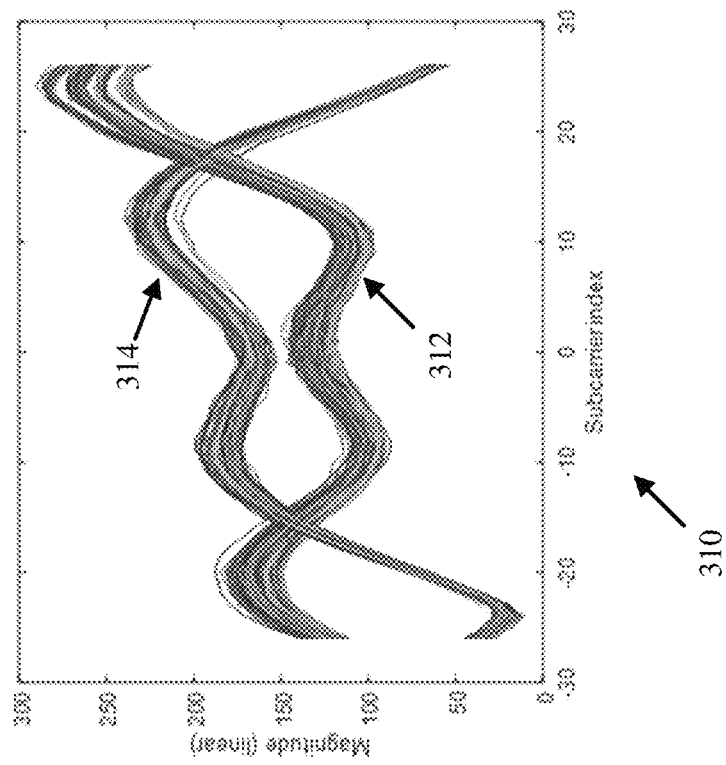

Reference is made to FIG. 3, which schematically illustrates graphs 310 and 320 depicting channel estimates when there are changes in a transmit parameter set, in accordance with some demonstrative embodiments.

In some demonstrative embodiments, the graphs 310 and 320 depict CFRs corresponding to PPDUs transmitted from two respective different wireless communication devices during a predefined time period, e.g., of about 3 minutes, e.g., as described below.

In some demonstrative embodiments, each curve of the graphs 310 and 320 corresponds to a PPDU received by a wireless sensing device during the predefined time period, for example, when there is no motion in the environment.

In some demonstrative embodiments, graph 310 depicts a plurality of magnitude curves corresponding to a first respective plurality of PPDUs transmitted from a first wireless communication device. For example, a magnitude curve includes a plurality of magnitude measurements corresponding to a plurality of subcarriers of a PPDU of the first plurality of PPDUs.

In some demonstrative embodiments, graph 320 depicts a second plurality of magnitude curves corresponding to a respective plurality of PPDUs transmitted from a second wireless communication device. For example, a magnitude curve includes a plurality of magnitude measurements corresponding to a plurality of subcarriers of a PPDU of the second plurality of PPDUs.

In some demonstrative embodiments, graph 310 and graph 320 each depict an impact of changes in the transmit parameter set. For example, the first and second wireless communication devices may change between two different transmit parameter configurations over time while transmitting the PPDUs, e.g., beacon frames.

In some demonstrative embodiments, as shown in graph 310, a first group of channel estimates 312 may correspond to PPDUs transmitted according to a first parameter set, and a second group of channel estimates 314 may correspond to PPDUs transmitted according to a second parameter set, e.g., different from the first parameter set.

In some demonstrative embodiments, as shown in graph 320, a first group of channel estimates 322 may correspond to PPDUs transmitted according to a first parameter set, and a second group of channel estimates 324 may correspond to PPDUs transmitted according to a second parameter set, e.g., different from the first parameter set.

Referring back to FIG. 1, in some demonstrative embodiments, wireless sensing component 110 may be configured to cluster a plurality of channel estimates into a plurality of clusters, for example, based on a clustering criterion, e.g., as described below.

In some demonstrative embodiments, wireless sensing component 110 may implement a machine learning-based mechanism, which may significantly enhance a reliability and/or an accuracy of wireless sensing, e.g., as describe below.

In some demonstrative embodiments, wireless sensing component 110 may be configured, for example, to classify and/or cluster different transmit configurations, which may be used by a given wireless communication device when transmitting packets for wireless sensing, and/or to process measurements identified to correspond to different transmitter configurations in an appropriate way, e.g., as described below.

In some demonstrative embodiments, wireless sensing component 110 may be configured to provide a solution to a negative impact of changes in transmit parameter sets to wireless sensing applications. For example, wireless sensing component 110 may "learn" the impact of different transmit parameter sets to the received PPDUs, for example, to distinguish between a change in transmit parameter sets, and a change from a motion in an environment.

In some demonstrative embodiments, wireless sensing component 110 may implement a signal processing block, module, method and/or algorithm configured to classify or cluster channel estimates, for example, among a finite number of possible transmit parameter sets, e.g., as described below.

In one example, a number of possible parameter sets may be estimated, for example, as part of the process of clustering the channel estimates.

In some demonstrative embodiments, the classification or clustering of the channel estimates may be performed by a suitable algorithm and/or method. For example, the classification of channel estimates may be performed using a k-nearest neighbors algorithm, a k-means clustering, a support vector machine, a naïve Bayes classifier, and/or any other suitable learning algorithm.

In some demonstrative embodiments, wireless sensing component 110 may be configured to use a channel estimate, for example, once a new channel estimate is classified or clustered, for example, to make a decision, based on the classification or clustering of the channel estimate, for example, whether a motion is detected or not. For example, channel estimates corresponding to different transmit parameter sets may not be used together. For example, phase and amplitude covariance matrices may be obtained using channel estimates having a same cluster, e.g., corresponding to a same transmit parameter set, e.g., as described below.

In some demonstrative embodiments, wireless sensing component 110 may be configured to cluster a plurality of channel estimation measurements into a plurality of clusters, for example, based on a clustering criterion, e.g., as described below.

In some demonstrative embodiments, the plurality of channel estimation measurements may correspond to a respective plurality of PPDUs received from a second wireless communication device, e.g., device 140, over a wireless communication channel, e.g., as described below.

In some demonstrative embodiments, radio 114 or receiver 116 may be configured to receive the plurality of PPDUs from device 140, for example, via antennas 107 over WM 103.

In some demonstrative embodiments, wireless sensing component 110 may be configured to, based on clustering of the plurality of channel estimation measurements into the plurality of clusters, selectively provide a clustered channel estimation measurement to be processed for detection of changes in an environment of the wireless communication channel, for example, by providing the clustered channel estimation measurement together with one or more other clustered channel estimation measurements of a same cluster of the clustered channel estimation measurement to be processed for the detection of the changes in the environment, e.g., as described below.

In some demonstrative embodiments, wireless sensing component 110 may be configured to selectively provide the clustered channel estimation measurement together with the one or more other clustered channel estimation measurements of the same cluster to be processed for detection of motion in the environment, e.g., as described below.

In other embodiments, wireless sensing component 110 may be configured to selectively provide the clustered channel estimation measurement together with the one or more other clustered channel estimation measurements of the same cluster to be processed for any other detection of any other change in the environment.

In some demonstrative embodiments, the plurality of PPDUs may include a plurality of beacon frames from device 140, e.g., as described below.

In one example, it may be advantageous to use beacon frames for wireless sensing, for example, since the beacon frames may be transmitted in a legacy mode, e.g., without a MIMO transmission scheme, and/or using a regular interval.

In other embodiments, the plurality of PPDUs may include any other type of frames from device 140.

In some demonstrative embodiments, the plurality of channel estimation measurements may include a plurality of Channel State Information (CSI) measurements, e.g., as described below.

In some demonstrative embodiments, the plurality of channel estimation measurements may include a plurality of Channel Frequency Response (CFR) measurements, e.g., as described below.

In some demonstrative embodiments, the plurality of channel estimation measurements may include a plurality of phase measurements, e.g., as described below.

In some demonstrative embodiments, a phase measurement corresponding to a PPDU may include a plurality of phases corresponding to a respective plurality of subcarriers of the PPDU, e.g., as described below.

In some demonstrative embodiments, the plurality of channel estimation measurements may include a plurality of magnitude measurements, e.g., as described below.

In some demonstrative embodiments, a magnitude measurement corresponding to a PPDU may include a plurality of magnitudes corresponding to a respective plurality of subcarriers of the PPDU, e.g., as described below.

In other embodiments, the plurality of channel estimation measurements may include any other additional or alternative measurements, e.g., as described below.

In some demonstrative embodiments, wireless sensing component 110 may be configured to cluster the plurality of channel estimation measurements into the plurality of clusters, for example, based on a transmit (Tx) configuration criterion corresponding to a Tx configuration for transmission of the PPDUs from device 140, e.g., as described below.

In some demonstrative embodiments, the plurality of clusters may include a plurality of Tx configuration clusters corresponding to a respective plurality of Tx configurations for transmission of the PPDUs from device 140, e.g., as described below.

In some demonstrative embodiments, wireless sensing component 110 may be configured to identify the plurality of Tx configurations for the transmission of the PPDUs from device 140, e.g., as described below.

In some demonstrative embodiments, wireless sensing component 110 may be configured to cluster the plurality of channel estimation measurements into the plurality of Tx configuration clusters based on the plurality of identified Tx configurations, respectively, e.g., as described below.

In some demonstrative embodiments, wireless sensing component 110 may be configured to provide a first plurality of clustered channel estimation measurements of a first cluster for processing by a first processing procedure for the detection of the changes in the environment, and to provide a second plurality of clustered channel estimation measurements of a second cluster for processing by a second processing procedure for the detection of the changes in the environment, e.g., as described below.

In some demonstrative embodiments, the second processing procedure may be separate from the first processing procedure, e.g., as described below.

Figure 4:
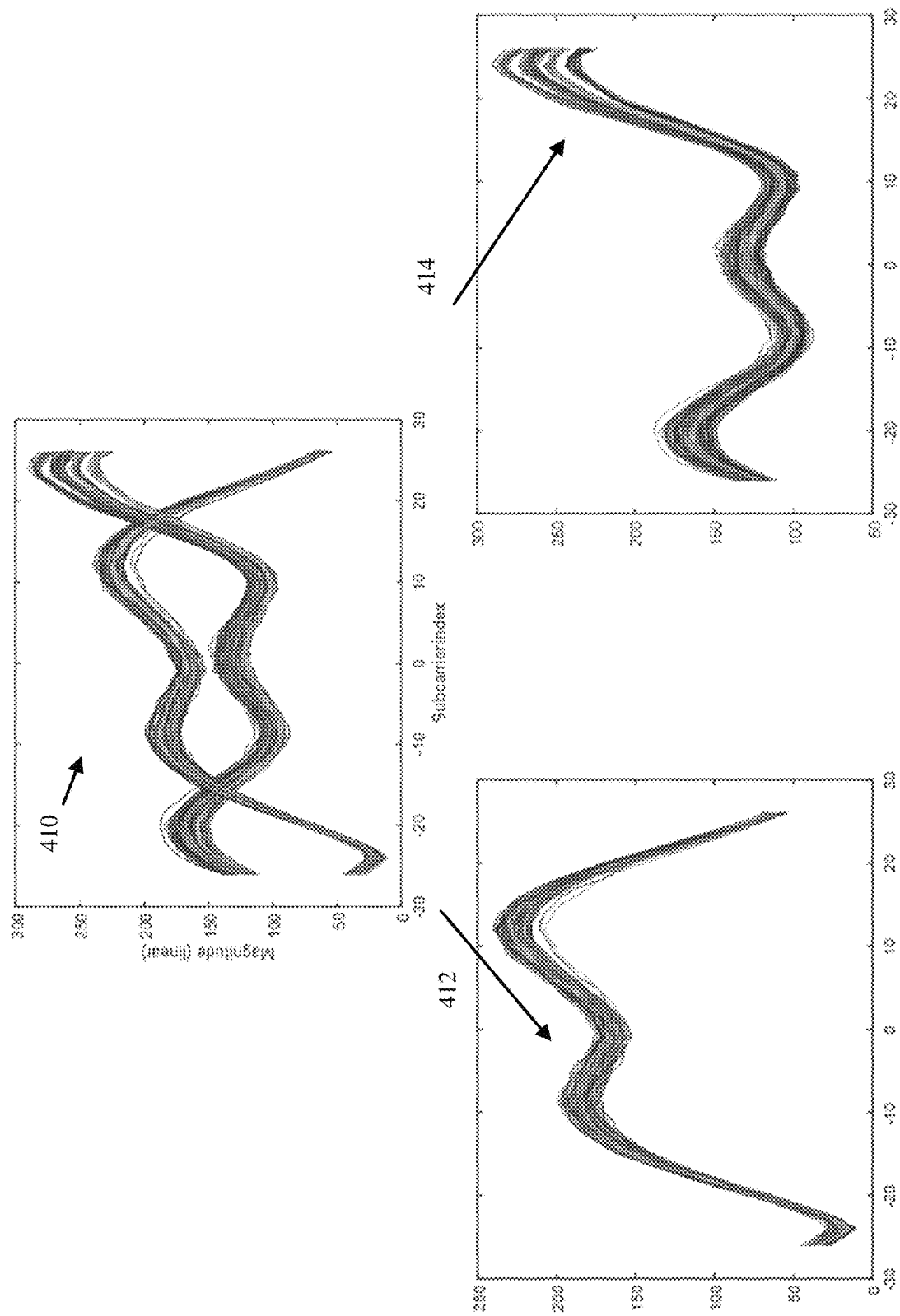
FIG. 4 is a schematic illustration of graphs depicting channel estimates clustered into two clusters, in accordance with some demonstrative embodiments.

Reference is made to FIG. 4, which schematically illustrates graphs depicting channel estimates 410 clustered into two clusters, in accordance with some demonstrative embodiments.

In some demonstrative embodiments, channel estimates 410 may include a plurality of magnitude curves corresponding to a respective plurality of PPDUs transmitted from a wireless communication device. For example, a magnitude curve includes a plurality of magnitude measurements corresponding to a plurality of sub carriers of a PPDU of the first plurality of PPDUs.

In some demonstrative embodiments, wireless sensing component 110 (FIG. 1) may be configured to cluster channel estimates 410 into a first channel estimates cluster 412 and a second channel estimates cluster 414.

In some demonstrative embodiments, wireless sensing component 110 (FIG. 1) may implement a k-means clustering algorithm to classify channel estimates 410 into the first channel estimates cluster 412 and the second channel estimates cluster 414.

In other embodiments, wireless sensing component 110 (FIG. 1) may implement any other clustering and/or classification method or algorithm to classify the channel estimates 410.

In some demonstrative embodiments, wireless sensing component 110 (FIG. 1) may provide first channel estimates cluster 412 for processing by a first processing procedure for the detection of the changes in the environment, and to provide second channel estimates cluster 414 for processing by a second processing procedure, for example, separate from the first processing procedure, for the detection of the changes in the environment, e.g., as described below.

In one example, channel estimates 410 correspond to a static environment, e.g., when there is no motion in the environment, and, therefore, the channel estimates do not show increased variations.

In another example, it may be noted that wireless sensing component 110 (FIG. 1) may not be required to know a priori whether there is a motion in the environment.

Figure 5:
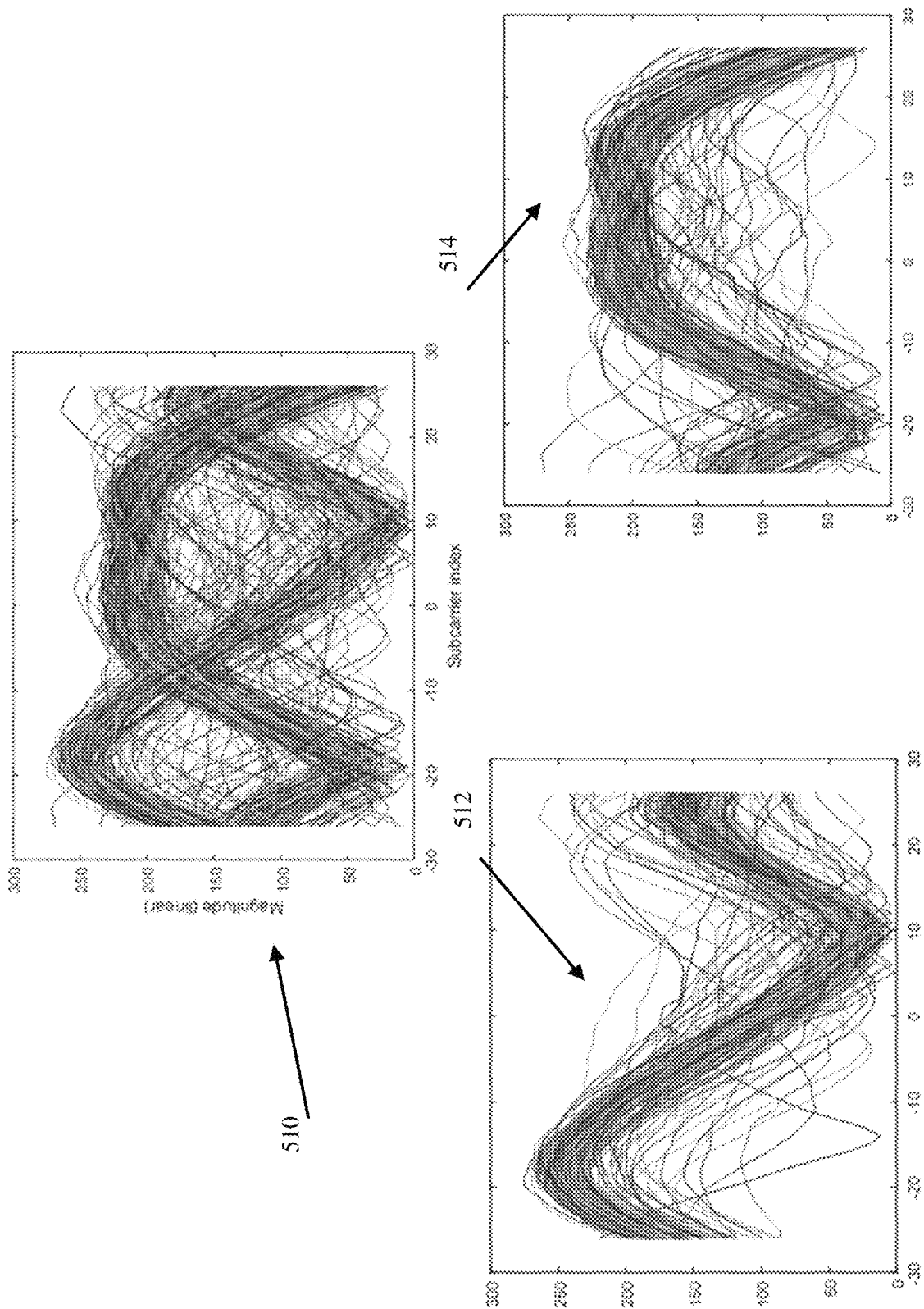
FIG. 5 is a schematic illustration of graphs depicting channel estimates clustered into two clusters, in accordance with some demonstrative embodiments.

Reference is made to FIG. 5, which schematically illustrates graphs depicting channel estimates clustered into two clusters, in accordance with some demonstrative embodiments.

In some demonstrative embodiments, channel estimates 510 may include a plurality of magnitude curves corresponding to a respective plurality of PPDUs transmitted from a wireless communication device. For example, a magnitude curve includes a plurality of magnitude measurements corresponding to a plurality of sub carriers of a PPDU of the first plurality of PPDUs.

In some demonstrative embodiments, wireless sensing component 110 (FIG. 1) may be configured to classify channel estimates 510 into a first channel estimates cluster 512 and a second channel estimates cluster 514.

In some demonstrative embodiments, wireless sensing component 110 (FIG. 1) may implement a k-means clustering algorithm to classify channel estimates 510 into the first channel estimates cluster 512 and the second channel estimates cluster 514.

In other embodiments, wireless sensing component 110 (FIG. 1) may implement any other clustering and/or classification method or algorithm to classify the channel estimates 510.

In some demonstrative embodiments, wireless sensing component 110 (FIG. 1) may provide first channel estimates cluster 512 for processing by a first processing procedure for the detection of the changes in the environment, and to provide second channel estimates cluster 514 for processing by a second processing procedure, for example, separate from the first processing procedure, for the detection of the changes in the environment, e.g., as described below.

In one example, channel estimates 510 may correspond to a dynamic environment, e.g., when there is motion in the environment, and, therefore, the channel estimates show increased variations, for example, due to both a change in transmitter configuration, and the motion in the environment.

In some demonstrative embodiments, as shown in FIG. 5, the classification of channel estimates 510 into clusters 512 and 514, e.g., according to the k-means clustering algorithm, may be relatively accurate, however, one or more classification errors may be observed.

Referring back to FIG. 1, in some demonstrative embodiments, wireless sensing component 110 may be configured to process a clustered channel estimation measurements for wireless sensing, e.g., as described below.

In some demonstrative embodiments, wireless sensing component 110 may be configured to process the clustered channel estimation measurement together with the one or more other clustered channel estimation measurements of the same cluster, for example, according to at least one wireless sensing algorithm to detect the changes in the environment, e.g., as described below.

In some demonstrative embodiments, wireless sensing component 110 may be configured to determine at least one covariance matrix, for example, based on the clustered channel estimation measurement together with the one or more other clustered channel estimation measurements, and to detect the changes in the environment based on the covariance matrix, e.g., as described below.

In other embodiments, wireless sensing component 110 may be configured to detect the changes in the environment based on any other matrix, method and/or metrics.

In some demonstrative embodiments, wireless sensing component 110 may be configured to determine one or more eigenvalues of the covariance matrix, and to detect the changes in the environment, for example, based on the one or more eigenvalues of the covariance matrix, e.g., as described below.

In some demonstrative embodiments, wireless sensing component 110 may be configured to determine a first-highest eigenvalue of the covariance matrix, and to detect the changes in the environment based on the first-highest eigenvalue of the covariance matrix, e.g., as described below.

In some demonstrative embodiments, wireless sensing component 110 may be configured to determine at least three-highest eigenvalues of the covariance matrix, and to detect the changes in the environment based on the three-highest eigenvalues of the covariance matrix, e.g., as described below.

In other embodiments, wireless sensing component 110 may be configured to detect the changes in the environment based on any other number of eigenvalues.

In some demonstrative embodiments, wireless sensing component 110 may be configured to output a motion alert to indicate motion in the environment, for example, based on detection of the changes in the environment.

In some demonstrative embodiments, application 125 may receive the motion alert from wireless sensing component 110, and, for example, alert, notify and/or message a user of application 125 about a motion in the environment.

In some demonstrative embodiments, wireless sensing component 110 may be configured to quantify how much an estimated channel changed over a given time interval or over a given number of PPDUs.

In one example, wireless sensing component 110 may quantify the estimated channel changes, for example, using the covariance matrix and/or the eigenvalues, e.g., as described below.

Figure 6:
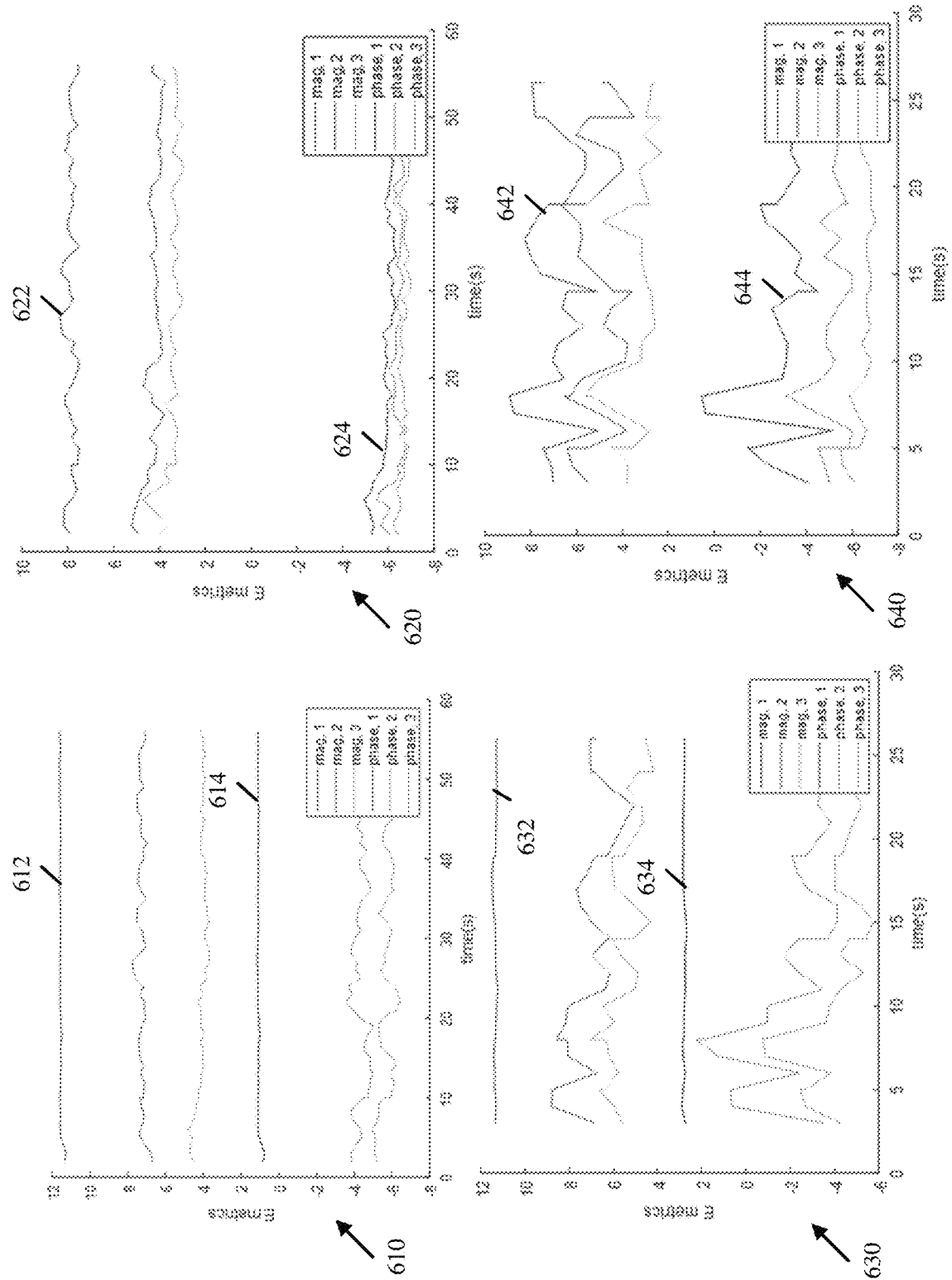
FIG. 6 is a schematic illustration of graphs depicting eigenvalues of covariance matrices based on channel estimates, in accordance with some demonstrative embodiments.

Reference is made to FIG. 6, which schematically illustrates graphs 610, 630, 620, and 620 depicting eigenvalues of covariance matrices, in accordance with some demonstrative embodiments.

In some demonstrative embodiments, the eigenvalues of the covariance matrices of FIG. 6 may be obtained in a static environment.

In some demonstrative embodiments, graph 610 depicts a first eigenvalue group including 3 largest magnitude eigenvalues of a magnitude covariance matrix and 3 largest phase eigenvalues of a phase covariance matrix corresponding to the channel estimates of graph 410 (FIG. 4).

In some demonstrative embodiments, the first eigenvalue group of graph 610, e.g., the 3 largest phase eigenvalues and the three largest magnitude eigenvalues, may be obtained if the channel estimates 410 (FIG. 4) are not clustered into first channel estimates cluster 412 and second channel estimates cluster 414.

In some demonstrative embodiments, graph 620 depicts a second eigenvalue group including 3 largest magnitude eigenvalues of a magnitude covariance matrix and 3 largest phase eigenvalues of a phase covariance matrix corresponding to the channel estimates of graph 410 (FIG. 4).

In some demonstrative embodiments, the second eigenvalue group of graph 620, e.g., the 3 largest phase eigenvalues and the three largest magnitude eigenvalues, may be obtained by clustering the channel estimates 410 (FIG. 4) into first channel estimates cluster 412 and second channel estimates cluster 414.

In some demonstrative embodiments, graph 630 depicts a first eigenvalue group including 3 largest magnitude eigenvalues of a magnitude covariance matrix and 3 largest phase eigenvalues of a phase covariance matrix corresponding to the channel estimates of graph 320 (FIG. 3).

In some demonstrative embodiments, the first eigenvalue group of graph 630, e.g., the 3 largest phase eigenvalues and the three largest magnitude eigenvalues, may be obtained if the channel estimates 320 (FIG. 3) are not clustered into clusters.

In some demonstrative embodiments, graph 640 depicts a second eigenvalue group including 3 largest magnitude eigenvalues of a magnitude covariance matrix and 3 largest phase eigenvalues of a phase covariance matrix corresponding to the channel estimates of graph 320 (FIG. 3).

In some demonstrative embodiments, the second eigenvalue group of graph 640, e.g., the 3 largest phase eigenvalues and the three largest magnitude eigenvalues, may be obtained when clustering the channel estimates 320 (FIG. 3) into a first channel estimates cluster a second channel estimates cluster.

In some demonstrative embodiments, wireless sensing component 110 (FIG. 1) may be configured to determine the eigenvalues of the covariance matrices based on the channel estimates, e.g., the 3 largest phase eigenvalues and the three largest magnitude eigenvalues of each graph.

In one example, wireless sensing component 110 (FIG. 1) may be configured to quantify an impact of a change in a transmit parameter set, for example, by calculating the three largest eigenvalues, or any other number of eigenvalues, of the covariance matrices obtained with the amplitude and phase of 20 consecutive complex channel estimates, or any other number of channel estimates.

In some demonstrative embodiments, the eigenvalues, may be seen as a variance of the measurements, e.g., to a certain extent.

In some demonstrative embodiments, wireless sensing component 110 (FIG. 1) may identify changes in the transmit parameter set, e.g., by clustering the channel estimates, and using CFRs that correspond to just one of the two parameter sets, for example, the eigenvalues of graph 620 and graph 640.

In some demonstrative embodiments, when comparing the eigenvalues of graph 610 to the eigenvalues of graph 620 and/or the eigenvalues of graph 620 to the eigenvalues of graph 640 it is seen that the eigenvalues, e.g., a variance of the measurements, reduce significantly, for example, as a result of clustering the channel estimates.

In one example, clustering the channel estimates may result in a first-highest magnitude eigenvalue 622, which may be significantly reduced, compared, for example, to a first-highest magnitude eigenvalue 612, which may be obtained without clustering the channel estimates.

In another example, clustering the channel estimates may result in a first-highest magnitude eigenvalue 642, which may be significantly reduced, compared, for example, to a first-highest magnitude eigenvalue 632, which may be obtained without clustering the channel estimates.

In another example, clustering the channel estimates may result in a first-highest phase eigenvalue 624, which may be significantly reduced, compared, for example, to a first-highest phase eigenvalue 614, which may be obtained without clustering the channel estimates.

In another example, clustering the channel estimates may result in a first-highest phase eigenvalue 644, which may be significantly reduced, compared, for example, to a first-highest phase eigenvalue 634, which may be obtained without clustering the channel estimates.

In some demonstrative embodiments, the observed reduction in variance may result in an improved wireless sensing, for example, when a motion may be present in the environment, e.g., as described below.

Figure 7:
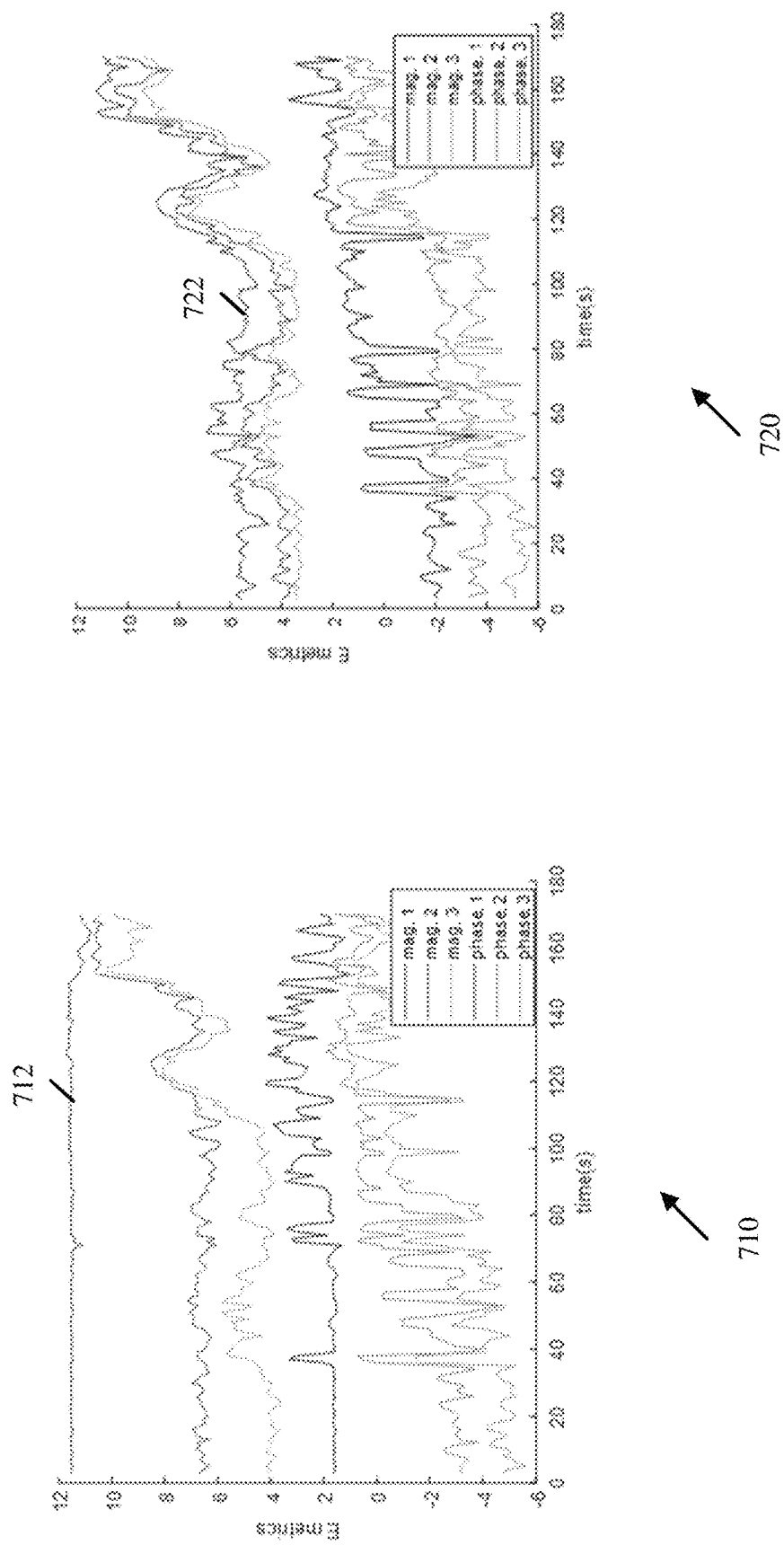
FIG. 7 is a schematic illustration of graphs depicting eigenvalues of covariance matrices based on channel estimates, in accordance with some demonstrative embodiments.

Reference is made to FIG. 7, which schematically illustrates graphs 710 and 720 depicting eigenvalues of covariance matrices obtained in a dynamic environment, in accordance with some demonstrative embodiments.

In some demonstrative embodiments, graph 710 depicts 3 largest magnitude eigenvalues of a magnitude covariance matrix and 3 largest phase eigenvalues of a phase covariance matrix corresponding to the channel estimates of graph 510 (FIG. 5).

In some demonstrative embodiments, the eigenvalues of graph 710, e.g., the 3 largest phase eigenvalues and the three largest magnitude eigenvalues, may be obtained if the channel estimates 510 (FIG. 5) are not clustered into clusters.

In some demonstrative embodiments, graph 720 depicts 3 largest magnitude eigenvalues of a magnitude covariance matrix and 3 largest phase eigenvalues of a phase covariance matrix corresponding to the channel estimates of graph 510 (FIG. 5).

In some demonstrative embodiments, the eigenvalues of graph 720, e.g., the 3 largest phase eigenvalues and the three largest magnitude eigenvalues, may be obtained when clustering the channel estimates 510 (FIG. 5) into first channel estimates cluster 512 (FIG. 5) and second channel estimates cluster 514 (FIG. 5).

In some demonstrative embodiments, wireless sensing component 110 (FIG. 1) may be configured to determine the eigenvalues of graph 720, e.g., the 3 largest phase eigenvalues and the three largest magnitude eigenvalues of each graph, for example, based on the clustering the channel estimates 510 (FIG. 5) into first channel estimates cluster 512 (FIG. 5) and second channel estimates cluster 514 (FIG. 5).

In one example, an impact of clustering the channel estimates 510 (FIG. 5) based on a transmit parameter criterion may be seen, for example, from a comparison between graph 710 and graph 720, e.g., as described below.

In some demonstrative embodiments, when comparing the eigenvalues of graph 710 to the eigenvalues of graph 720 it is seen that the eigenvalues, e.g., a variance of the measurements, reduce significantly, for example, when clustering the channel estimates 510 (FIG. 5).

In one example, a value of one or more eigenvalues may be greatly reduced, for example, when transmit parameter set clustering is used. For example, it may be advantageous to employ the clustering of channel estimates 510 (FIG. 5), despite changes to the channel estimates 510 (FIG. 5), for example, due to motion and an increased classification error rate.

In some demonstrative embodiments, the largest eigenvalues, e.g., for phase and/or magnitude, may appear constant, for example, when classification is not used. However, when classification is used, the largest eigenvalues may correspond to changes in the environment, which may increase a reliability of the wireless sensing.

In one example, clustering the channel estimates 510 (FIG. 5) may result in a first-highest magnitude eigenvalue 722, which may be significantly reduced, compared, for example, to a first-highest magnitude eigenvalue 712, which may be obtained without clustering the channel estimates. For example, using the first-highest magnitude eigenvalues 712 for detection of changes in the dynamic environment may not be feasible due to increased variance, which may cause the first-highest magnitude eigenvalues 712 to show as constant.

In some demonstrative embodiments, clustering the channel estimates 510 (FIG. 5) into channel estimates clusters 512 and 514 (FIG. 5) may allow to obtain the first-highest magnitude eigenvalue 722, which may be reduced, for example, compared to the first-highest magnitude eigenvalue 712, which may not be usable.

In some demonstrative embodiments, as shown by graph 720, when clustering the channel estimates 510 (FIG. 5), it may be more simple to detect that the environment is static until approximately 115 seconds and then motion starts in the environment and continues until the end of the experiment.

Figure 8A:
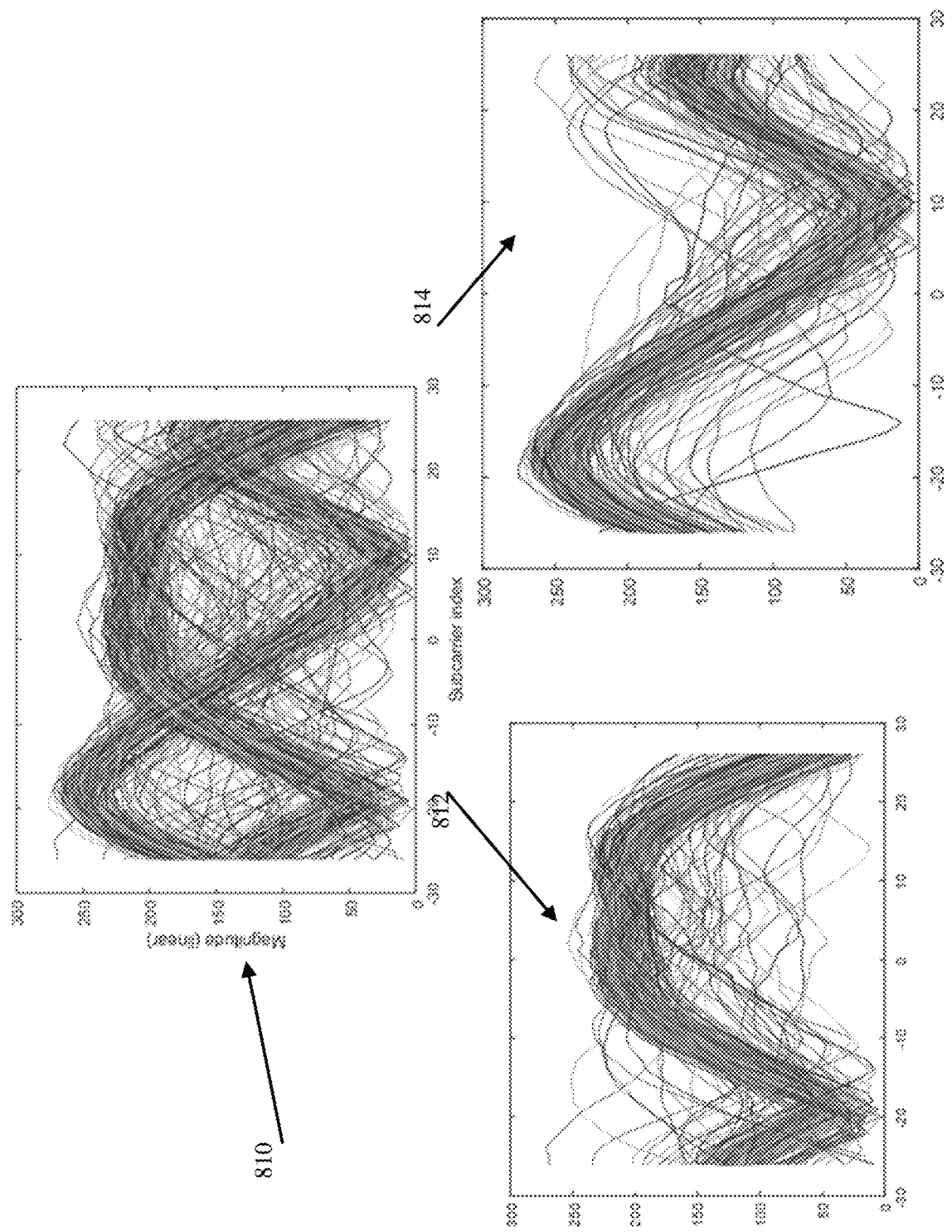
FIG. 8A is a schematic illustration of graph depicting channel estimates clustered into two clusters, in accordance with some demonstrative embodiments.

Reference is made to FIG. 8A, which schematically illustrates graphs depicting channel estimates 810 clustered into two clusters, in accordance with some demonstrative embodiments.

In some demonstrative embodiments, channel estimates 810 may include a plurality of magnitude curves corresponding to a respective plurality of PPDUs transmitted from a wireless communication device. For example, a magnitude curve includes a plurality of magnitude measurements corresponding to a plurality of subcarriers of a PPDU of the plurality of PPDUs.

In some demonstrative embodiments, wireless sensing component 110 (FIG. 1) may be configured to cluster channel estimates 810 into a first Tx configuration cluster 812 and a second Tx configuration cluster 814.

Figure 8B:
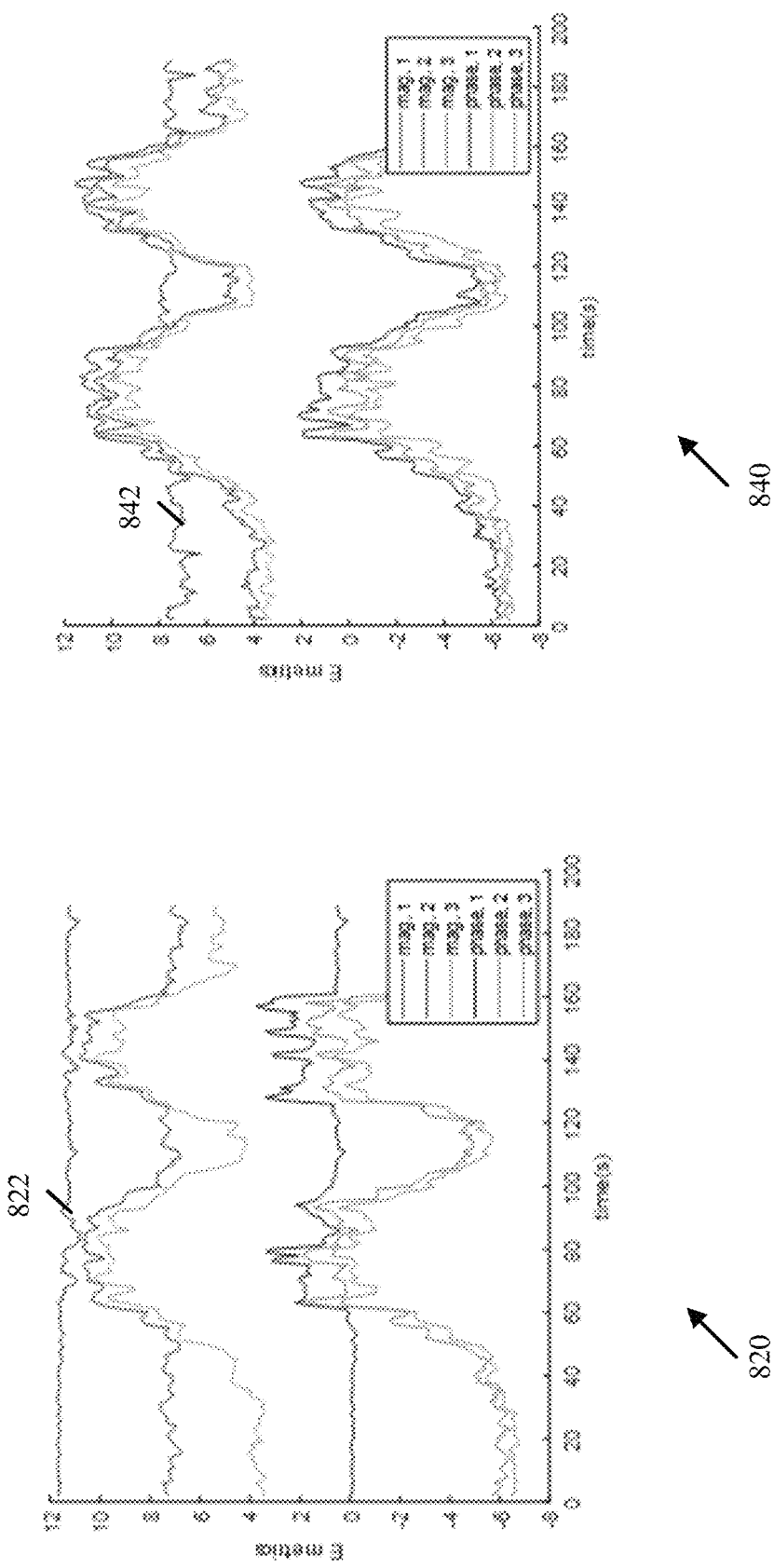
FIG. 8B is a schematic illustration of graphs depicting eigenvalues of covariance matrices based on the channel estimates of FIG. 8A, in accordance with some demonstrative embodiments.

Reference is made to FIG. 8B, which schematically illustrates graphs 820 and 840 depicting eigenvalues of covariance matrices based on the channel estimates of FIG. 8A, in accordance with some demonstrative embodiments.

In some demonstrative embodiments, graph 820 depicts a first group of eigenvalues including 3 largest magnitude eigenvalues of a magnitude covariance matrix and 3 largest phase eigenvalues of a phase covariance matrix corresponding to channel estimates 810.

In some demonstrative embodiments, the first group of eigenvalues, e.g., the 3 largest phase eigenvalues and the three largest magnitude eigenvalues, may be obtained if the channel estimates 810 are not clustered into first Tx configuration cluster 812 and second Tx configuration cluster 814.

In some demonstrative embodiments, graph 840 depicts a second group of eigenvalues including 3 largest magnitude eigenvalues of a magnitude covariance matrix and 3 largest phase eigenvalues of a phase covariance matrix corresponding to channel estimates 810.

In some demonstrative embodiments, the second group of eigenvalues of graph 840, e.g., the 3 largest phase eigenvalues and the three largest magnitude eigenvalues, may be obtained when clustering the channel estimates 810 into first Tx configuration cluster 812 and second Tx configuration cluster 814.

In some demonstrative embodiments, when comparing the eigenvalues of graph 820 with the eigenvalues of graph 840 it is seen that the eigenvalues, e.g., a variance of the measurements, reduce significantly, for example, when clustering the channel estimates 810 into first Tx configuration cluster 812 and second Tx configuration cluster 814.

In one example, clustering the channel estimates 810 (FIG. 5) into first Tx configuration cluster 812 and second Tx configuration cluster 814 may result with a first-highest magnitude eigenvalue 842, which may be significantly reduced, compared, for example, to a first-highest magnitude eigenvalue 822, which may be obtained without clustering the channel estimates 810. For example, using the first-highest magnitude eigenvalue 822 for detection of changes in the dynamic environment may not be feasible, for example, since first-highest magnitude eigenvalue 822 appears constant. However, when using first-highest magnitude eigenvalue 842 of graph 840, it may be more simple to detect changes in the environment and to determine a first instance of movement, e.g., between 55 and 100 seconds, and a second instance of movement, e.g., between 125 to 165 seconds.

Figure 9:
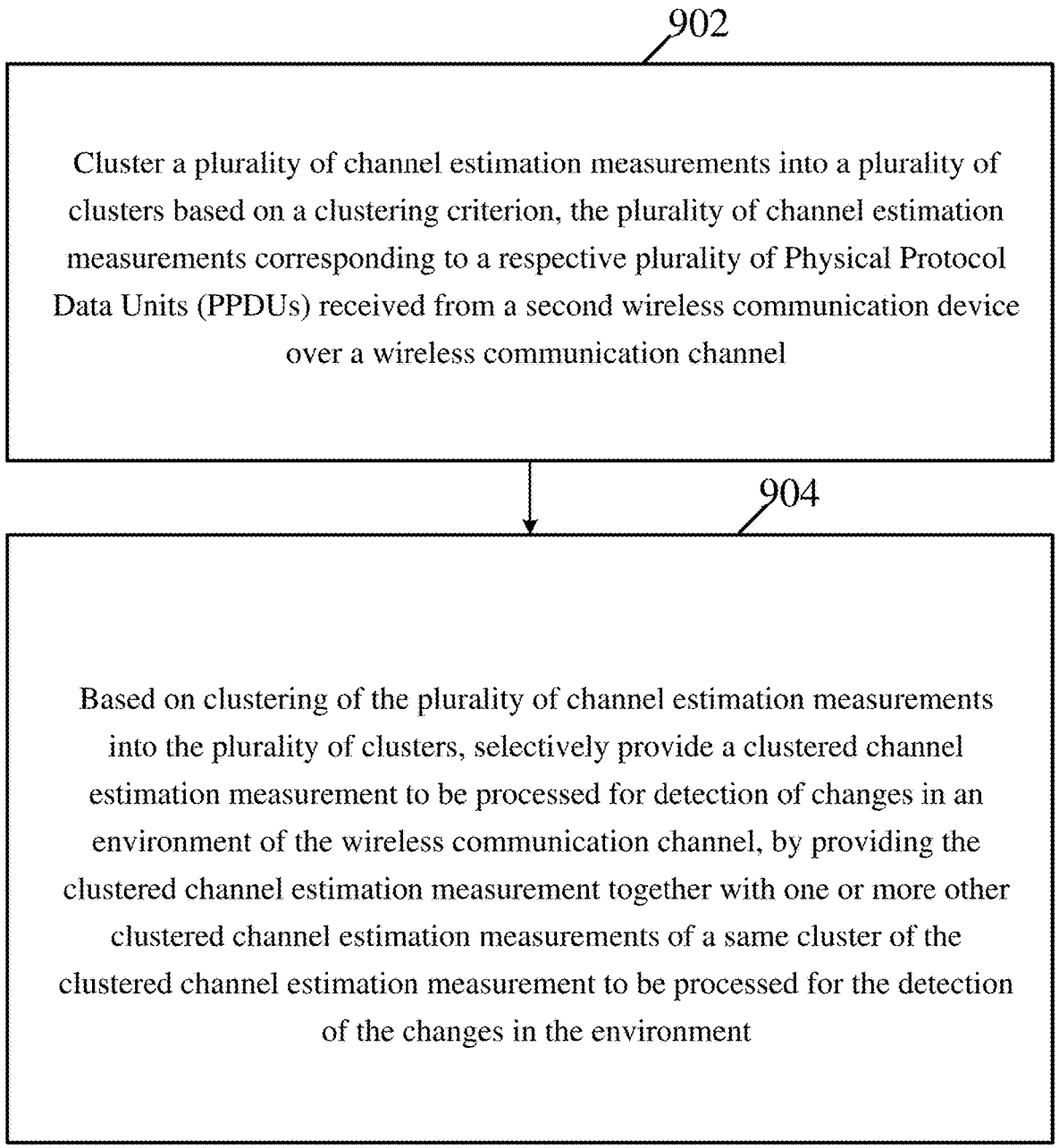
FIG. 9 is a schematic flow-chart illustration of a method of wireless sensing, in accordance with some demonstrative embodiments.

Reference is made to FIG. 9, which schematically illustrates a method of wireless sensing, in accordance with some demonstrative embodiments. For example, one or more operations of the method of FIG. 9 may be performed by one or more elements of a system, e.g., system 100 (FIG. 1), for example, one or more wireless devices, e.g., device 102 (FIG. 1), a controller, e.g., controller 124 (FIG. 1), a wireless sensing component, e.g., wireless sensing component 110 (FIG. 1), an application, e.g., application 125 (FIG. 1), a radio, e.g., radio 114 (FIG. 1), a receiver, e.g., receiver 116 (FIG. 1), and/or a message processor, e.g., message processor 128 (FIG. 1).

As indicated at block 902, the method may include clustering a plurality of channel estimation measurements into a plurality of clusters based on a clustering criterion, the plurality of channel estimation measurements corresponding to a respective plurality of PPDUs received from a second wireless communication device over a wireless communication channel. For example, wireless sensing component 110 (FIG. 1) may be configured to cluster the plurality of channel estimation measurements into the plurality of clusters based on the clustering criterion, the plurality of channel estimation measurements corresponding to the respective plurality of PPDUs received from device 140 (FIG. 1) over the wireless communication channel, e.g., as described below.

As indicated at block 904, the method may include, based on clustering of the plurality of channel estimation measurements into the plurality of clusters, selectively providing a clustered channel estimation measurement to be processed for detection of changes in an environment of the wireless communication channel, by providing the clustered channel estimation measurement together with one or more other clustered channel estimation measurements of a same cluster of the clustered channel estimation measurement to be processed for the detection of the changes in the environment. For example, wireless sensing component 110 (FIG. 1) may be configured to, based on the clustering of the plurality of channel estimation measurements into the plurality of clusters, selectively provide the clustered channel estimation measurement to be processed for detection of changes in the environment of the wireless communication channel, by providing the clustered channel estimation measurement together with one or more other clustered channel estimation measurements of the same cluster of the clustered channel estimation measurement to be processed for the detection of the changes in the environment, e.g., as described below.

Figure 10:
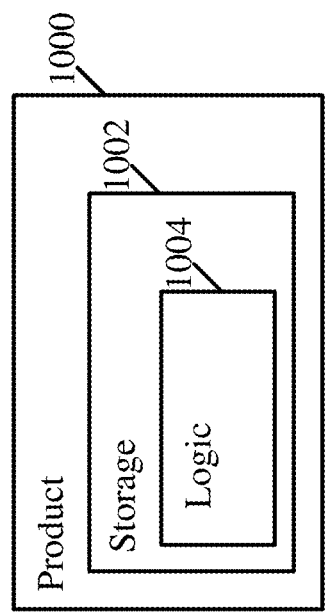
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable ("machine-readable") non-transitory storage media 1002, which may include computer-executable instructions, e.g., implemented by logic 1004, operable to, when executed by at least one computer processor, enable the at least one computer processor to implement one or more operations at device 102 (FIG. 1), radio 114 (FIG. 1), receiver 116 (FIG. 1), transmitter 118 (FIG. 1), wireless sensing component 110 (FIG. 1), application 125 (FIG. 1), controller 124 (FIG. 1), and/or message processor 128 (FIG. 1), to cause device 102 (FIG. 1), radio 114 (FIG. 1), receiver 116 (FIG. 1), transmitter 118 (FIG. 1), wireless sensing component 110 (FIG. 1), application 125 (FIG. 1), controller 124 (FIG. 1), and/or message processor 128 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, 8 and/or 9, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 1000 and/or machine-readable storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first wireless communication device to cluster a plurality of channel estimation measurements into a plurality of clusters based on a clustering criterion, the plurality of channel estimation measurements corresponding to a respective plurality of Physical Protocol Data Units (PPDUs) received from a second wireless communication device over a wireless communication channel; and based on clustering of the plurality of channel estimation measurements into the plurality of clusters, selectively provide a clustered channel estimation measurement to be processed for detection of changes in an environment of the wireless communication channel, by providing the clustered channel estimation measurement together with one or more other clustered channel estimation measurements of a same cluster of the clustered channel estimation measurement to be processed for the detection of the changes in the environment.

Example 2 includes the subject matter of Example 1, and optionally, wherein the plurality of clusters comprises a plurality of transmit (Tx) configuration clusters corresponding to a respective plurality of Tx configurations for transmission of the PPDUs from the second wireless communication station.

Example 3 includes the subject matter of Example 1 or 2, and optionally, wherein the apparatus is configured to cause the first wireless communication device to identify a plurality of transmit (Tx) configurations for transmission of the PPDUs from the second wireless communication device; and cluster the plurality of channel estimation measurements into a plurality of Tx configuration clusters based on the plurality of Tx configurations, respectively.

Example 4 includes the subject matter of any one of Examples 1-3, and optionally, wherein the clustering criterion comprises a transmit (Tx) configuration criterion corresponding to a Tx configuration for transmission of the PPDUs from the second wireless communication device.

Example 5 includes the subject matter of any one of Examples 1-4, and optionally, wherein the apparatus is configured to cause the first wireless communication device to provide a first plurality of clustered channel estimation measurements of a first cluster for processing by a first processing procedure for the detection of the changes in the environment, and to provide a second plurality of clustered channel estimation measurements of a second cluster for processing by a second processing procedure for the detection of the changes in the environment.

Example 6 includes the subject matter of Example 5, and optionally, wherein the second processing procedure is separate from the first processing procedure.

Example 7 includes the subject matter of any one of Examples 1-6, and optionally, wherein the apparatus is configured to cause the first wireless communication device to process the clustered channel estimation measurement together with the one or more other clustered channel estimation measurements of the same cluster according to at least one wireless sensing algorithm to detect the changes in the environment.

Example 8 includes the subject matter of Example 7, and optionally, wherein the apparatus is configured to cause the first wireless communication device to determine at least one covariance matrix based on the clustered channel estimation measurement together with the one or more other clustered channel estimation measurements, and to detect the changes in the environment based on the covariance matrix.

Example 9 includes the subject matter of Example 8, and optionally, wherein the apparatus is configured to cause the first wireless communication device to determine one or more eigenvalues of the covariance matrix, and to detect the changes in the environment based on the one or more eigenvalues of the covariance matrix.

Example 10 includes the subject matter of Example 8 or 9, and optionally, wherein the apparatus is configured to cause the first wireless communication device to determine a first-highest eigenvalue of the covariance matrix, and to detect the changes in the environment based on the first-highest eigenvalue of the covariance matrix.

Example 11 includes the subject matter of any one of Examples 8-10, and optionally, wherein the apparatus is configured to cause the first wireless communication device to determine at least three-highest eigenvalues of the covariance matrix, and to detect the changes in the environment based on the three-highest eigenvalues of the covariance matrix.

Example 12 includes the subject matter of any one of Examples 7-11, and optionally, wherein the apparatus is configured to cause the first wireless communication device to, based on detection of the changes in the environment, output a motion alert to indicate motion in the environment.

Example 13 includes the subject matter of any one of Examples 1-12, and optionally, wherein the plurality of channel estimation measurements comprises a plurality of magnitude measurements, a magnitude measurement comprising a plurality of magnitudes corresponding to a respective plurality of subcarriers of a PPDU of the plurality of PPDUs.

Example 14 includes the subject matter of any one of Examples 1-13, and optionally, wherein the plurality of channel estimation measurements comprises a plurality of phase measurements, a phase measurement comprising a plurality of phases corresponding to a respective plurality of subcarriers of a PPDU of the plurality of PPDUs.

Example 15 includes the subject matter of any one of Examples 1-14, and optionally, wherein the plurality of channel estimation measurements comprises a plurality of Channel State Information (CSI) measurements.

Example 16 includes the subject matter of any one of Examples 1-15, and optionally, wherein the plurality of channel estimation measurements comprises a plurality of Channel Frequency Response (CFR) measurements.

Example 17 includes the subject matter of any one of Examples 1-16, and optionally, wherein the apparatus is configured to cause the first wireless communication device to selectively provide the clustered channel estimation measurement together with the one or more other clustered channel estimation measurements of the same cluster to be processed for detection of motion in the environment.

Example 18 includes the subject matter of any one of Examples 1-17, and optionally, wherein the plurality of PPDUs comprises a plurality of beacon frames from the second wireless communication device.

Example 19 includes the subject matter of any one of Examples 1-18, and optionally, comprising a radio to receive the plurality of PPDUs.

Example 20 includes the subject matter of Example 19, and optionally, comprising one or more antennas connected to the radio, a memory to store data processed by the first wireless communication device, and a processor to execute instructions of an operating system.

Example 21 comprises an apparatus comprising means for executing any of the described operations of Examples 1-20.

Example 22 comprises a machine readable medium that stores instructions for execution by a processor to perform any of the described operations of Examples 1-20.

Example 23 comprises an apparatus comprising: a memory interface; and processing circuitry configured to: perform any of the described operations of Examples 1-20.

Example 24 comprises a method to perform any of the described operations of Examples 1-20.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:
1. An apparatus comprising logic and circuitry configured to cause a first wireless communication device to:
cluster a plurality of channel estimation measurements into a plurality of clusters based on a clustering criterion, the plurality of channel estimation measurements corresponding to a respective plurality of Physical Protocol Data Units (PPDUs) received from a second wireless communication device over a wireless communication channel, wherein the clustering criterion comprises a transmit (Tx) configuration criterion corresponding to a Tx configuration for transmission of the plurality of PPDUs from the second wireless communication device; and
based on clustering of the plurality of channel estimation measurements into the plurality of clusters, selectively provide a clustered channel estimation measurement to be processed for detection of changes in an environment of the wireless communication channel, by providing the clustered channel estimation measurement together with one or more other clustered channel estimation measurements of a same cluster of the clustered channel estimation measurement to be processed for the detection of the changes in the environment.

2. The apparatus of claim 1, wherein the plurality of clusters comprises a plurality of Tx configuration clusters corresponding to a respective plurality of Tx configurations for transmission of the plurality of PPDUs from the second wireless communication station.

3. The apparatus of claim 1 configured to cause the first wireless communication device to:
identify a plurality of Tx configurations for transmission of the plurality of PPDUs from the second wireless communication device; and
cluster the plurality of channel estimation measurements into a plurality of Tx configuration clusters based on the plurality of Tx configurations, respectively.

4. The apparatus of claim 1, wherein the Tx configuration for transmission of the plurality of PPDUs from the second wireless communication device comprises a setting of at least one Tx parameter for transmission of the plurality of PPDUs from the second wireless communication device.

5. The apparatus of claim 1 configured to cause the first wireless communication device to provide a first plurality of clustered channel estimation measurements of a first cluster for processing by a first processing procedure for the detection of the changes in the environment, and to provide a second plurality of clustered channel estimation measurements of a second cluster for processing by a second processing procedure for the detection of the changes in the environment.

6. The apparatus of claim 5, wherein the second processing procedure is separate from the first processing procedure.

7. The apparatus of claim 1 configured to cause the first wireless communication device to process the clustered channel estimation measurement together with the one or more other clustered channel estimation measurements of the same cluster according to at least one wireless sensing algorithm to detect the changes in the environment.

8. The apparatus of claim 7 configured to cause the first wireless communication device to determine at least one covariance matrix based on the clustered channel estimation measurement together with the one or more other clustered channel estimation measurements, and to detect the changes in the environment based on the covariance matrix.

9. The apparatus of claim 8 configured to cause the first wireless communication device to determine one or more eigenvalues of the covariance matrix, and to detect the changes in the environment based on the one or more eigenvalues of the covariance matrix.

10. The apparatus of claim 8 configured to cause the first wireless communication device to determine a first-highest eigenvalue of the covariance matrix, and to detect the changes in the environment based on the first-highest eigenvalue of the covariance matrix.

11. The apparatus of claim 8 configured to cause the first wireless communication device to determine at least three-highest eigenvalues of the covariance matrix, and to detect the changes in the environment based on the three-highest eigenvalues of the covariance matrix.

12. The apparatus of claim 7 configured to cause the first wireless communication device to, based on detection of the changes in the environment, output a motion alert to indicate motion in the environment.

13. The apparatus of claim 1, wherein the plurality of channel estimation measurements comprises a plurality of magnitude measurements, a magnitude measurement comprising a plurality of magnitudes corresponding to a respective plurality of subcarriers of a PPDU of the plurality of PPDUs.

14. The apparatus of claim 1, wherein the plurality of channel estimation measurements comprises a plurality of phase measurements, a phase measurement comprising a plurality of phases corresponding to a respective plurality of subcarriers of a PPDU of the plurality of PPDUs.

15. The apparatus of claim 1, wherein the plurality of channel estimation measurements comprises a plurality of Channel State Information (CSI) measurements.

16. The apparatus of claim 1, wherein the plurality of channel estimation measurements comprises a plurality of Channel Frequency Response (CFR) measurements.

17. The apparatus of claim 1 configured to cause the first wireless communication device to selectively provide the clustered channel estimation measurement together with the one or more other clustered channel estimation measurements of the same cluster to be processed for detection of motion in the environment.

18. The apparatus of claim 1, wherein the plurality of PPDUs comprises a plurality of beacon frames from the second wireless communication device.

19. The apparatus of claim 1 comprising a radio to receive the plurality of PPDUs, one or more antennas connected to the radio, a memory to store data processed by the first wireless communication device, and a processor to execute instructions of an operating system.

20. A product comprising one or more tangible computer-readable non-transitory storage media comprising computer-executable instructions operable to, when executed by at least one processor, enable the at least one processor to cause a first wireless communication device to:
cluster a plurality of channel estimation measurements into a plurality of clusters based on a clustering criterion, the plurality of channel estimation measurements corresponding to a respective plurality of Physical Protocol Data Units (PPDUs) received from a second wireless communication device over a wireless communication channel, wherein the clustering criterion comprises a transmit (Tx) configuration criterion corresponding to a Tx configuration for transmission of the plurality of PPDUs from the second wireless communication device; and
based on clustering of the plurality of channel estimation measurements into the plurality of clusters, selectively provide a clustered channel estimation measurement to be processed for detection of changes in an environment of the wireless communication channel, by providing the clustered channel estimation measurement together with one or more other clustered channel estimation measurements of a same cluster of the clustered channel estimation measurement to be processed for the detection of the changes in the environment.

21. The product of claim 20, wherein the instructions, when executed, cause the first wireless communication device to:
identify a plurality of Tx configurations for transmission of the plurality of PPDUs from the second wireless communication device; and
cluster the plurality of channel estimation measurements into a plurality of Tx configuration clusters based on the plurality of Tx configurations, respectively.

22. The product of claim 20, wherein the instructions, when executed, cause the first wireless communication device to provide a first plurality of clustered channel estimation measurements of a first cluster for processing by a first processing procedure for the detection of the changes in the environment, and to provide a second plurality of clustered channel estimation measurements of a second cluster for processing by a second processing procedure for the detection of the changes in the environment.

23. The product of claim 20, wherein the instructions, when executed, cause the first wireless communication device to process the clustered channel estimation measurement together with the one or more other clustered channel estimation measurements of the same cluster according to at least one wireless sensing algorithm to detect the changes in the environment.

24. An apparatus of a first wireless communication device, the apparatus comprising:
  means for clustering a plurality of channel estimation measurements into a plurality of clusters based on a clustering criterion, the plurality of channel estimation measurements corresponding to a respective plurality of Physical Protocol Data Units (PPDUs) received from a second wireless communication device over a wireless communication channel, wherein the clustering criterion comprises a transmit (Tx) configuration criterion corresponding to a Tx configuration for transmission of the plurality of PPDUs from the second wireless communication device; and
  means for, based on clustering of the plurality of channel estimation measurements into the plurality of clusters, selectively providing a clustered channel estimation measurement to be processed for detection of changes in an environment of the wireless communication channel, by providing the clustered channel estimation measurement together with one or more other clustered channel estimation measurements of a same cluster of the clustered channel estimation measurement to be processed for the detection of the changes in the environment.

25. The apparatus of claim 24, wherein the plurality of clusters comprises a plurality of Tx configuration clusters corresponding to a respective plurality of Tx configurations for transmission of the plurality of PPDUs from the second wireless communication station.

* * * * *